Jan. 8, 1935. J. W. TATTER 1,987,275
ADJUSTABLE SPEED CONTROL MECHANISM
Filed Dec. 9, 1929  2 Sheets-Sheet 1
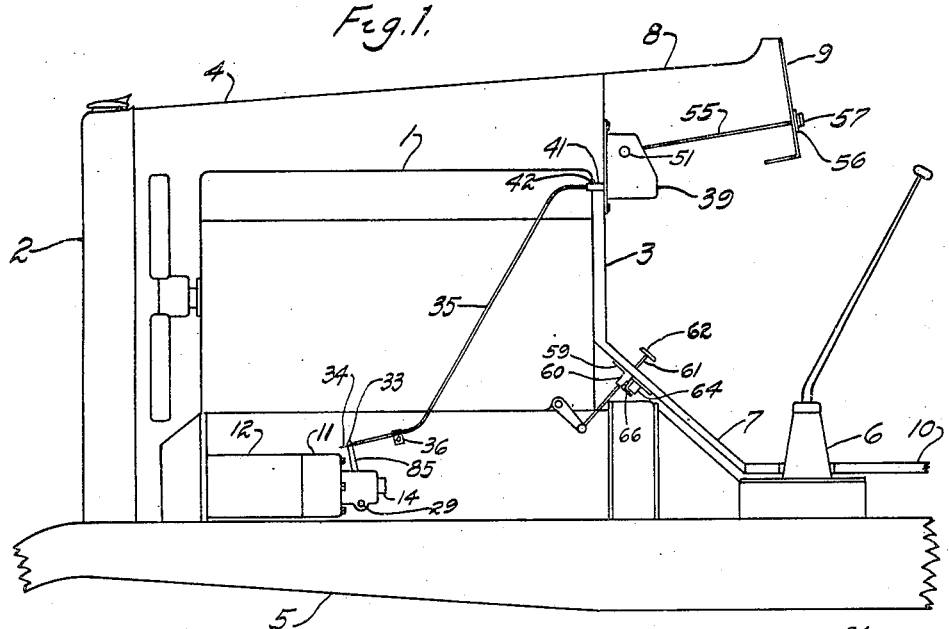
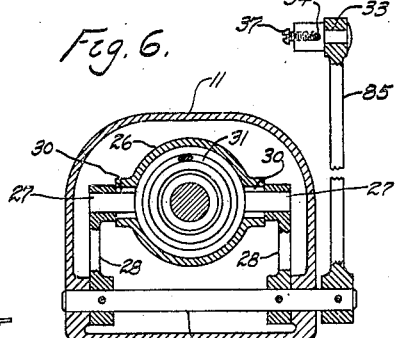
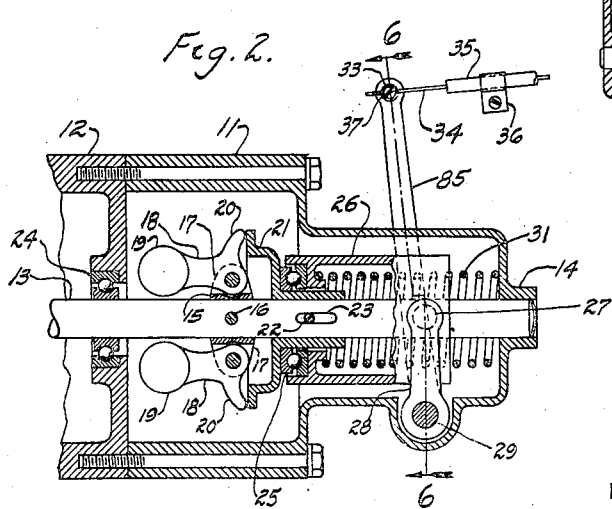
INVENTOR
John W. Tatter
BY George B. Ingersoll
ATTORNEY Jan. 8, 1935. J. W. TATTER 1,987,275
ADJUSTABLE SPEED CONTROL MECHANISM
Filed Dec. 9, 1929 2 Sheets-Sheet 2
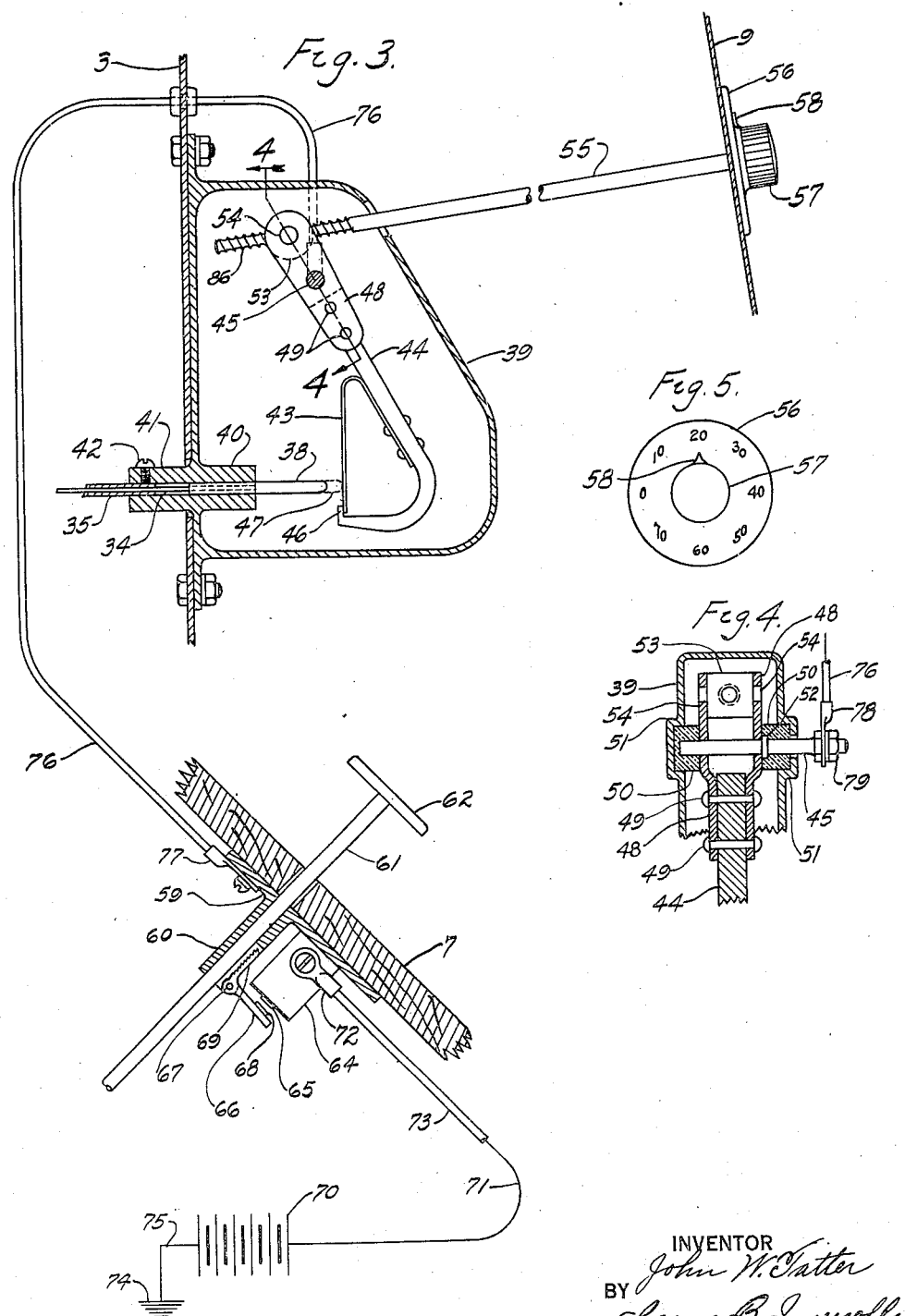
INVENTOR
John W. Tatter
BY George B. Ingersoll.
ATTORNEY Patented Jan. 8, 1935

1,987,275

UNITED STATES PATENT OFFICE 1,987,275

ADJUSTABLE SPEED CONTROL MECHANISM

John W. Tatter, Detroit, Mich.

Application December 9, 1929, Serial No. 412,903

19 Claims. (Cl. 123—98)

My invention relates to improvements in adjustable speed control mechanisms, in which an adjustable control mechanism is operated in conjunction with a speed governing device; and the objects of my improvement are, first, to provide a speed control mechanism, with adjustable means permitting readily selected rates of speed of the moving unit on which the speed control mechanism is installed and intended to control; second, to provide a speed control mechanism that will permit operation of the moving unit on which it is installed at speeds other than the set rates of speed; third, to provide a foot operated speed accelerating mechanism capable of being operated independently, if desired, of its selective speed control mechanism; fourth, to provide a speed control device having a governor mechanism developed for actuating parts requiring relatively light operating pressures; fifth, to provide a governor control mechanism capable of selective manual adjustment while the controlled unit is moving; sixth, to provide an adjustable speed mechanism incorporating electrically operated means engaging its foot accelerating mechanism; and seventh, to provide an adjustable speed control mechanism having an accelerating mechanism capable of being partially restrained in its operation.

I attain these objects by the mechanism illustrated in the accompanying drawings, in which—

Figure 1 is a view disclosing an installation of my device on an automotive vehicle; Fig. 2, a vertical section of the governor mechanism; Fig. 3, a vertical section of a dash panel adjusting mechanism and a foot board control mechanism together with their electrical units; Fig. 4, a sectional view of a portion of the dash panel adjusting mechanism taken on the line 4—4, Fig. 3; Fig. 5, a front elevation of an instrument panel speed dial; and Fig. 6, a sectional view of the governor mechanism taken on the line 6—6 of Fig. 2.

Similar numerals refer to similar parts throughout the several views.

In Fig. 1 is disclosed a portion of an automotive vehicle with its motor 1, radiator 2, dash panel 3, hood 4, frame 5, transmission 6, toe board 7, cowl 8, instrument panel 9, and floor board 10.

In Figs. 1 and 2, the housing 11 enclosing the governor mechanism is shown suitably attached to and mounted on the rear of the generator 12 which ordinarily constitutes a portion of the equipment for the motor 1, the generator being attached to a portion of the motor 1 and is operated by means connecting with other parts (not shown) of the motor. The driven shaft 13 of the generator is extended to form the driving means for the governor mechanism, the shaft 13 being supported in the bearing in the boss 14 of the housing 11 and by the bearing 24 in the housing of the generator 12. The member 15 is mounted on the shaft 13 and may be locked thereto by the pin 16. The member 15 is provided with oppositely disposed lugs 17 in which are pivotally mounted the bell cranks 18 which are in turn provided with counterweighted portions 19 together with arms 20. The arms 20 are adapted to contact with surfaces on the sleeve 21 which may be suitably restrained from revolving on the shaft 13 by the pin 22 being fastened in the shaft 13 and engaging the slots 23 in the barrel of the sleeve 21, the sleeve 21 being permitted to slidably move longitudinally on the shaft 13 when actuated by the arms 20 of the bell cranks 18. The thrust bearing 25 is mounted on the hub of the sleeve 21 and supports the sleeve 26 which engages the pins 27 of the levers 28 which are suitably fastened on the shaft 29 which in turn is mounted in the housing 11. The sleeve 26 is provided with slots 30 which engage the pins 27 and allow for the movement of the pins 27 above or below the center of the sleeve 26 when the levers 28 oscillate to and fro with the movement of the sleeve 26. The spring 31 is suitably mounted and compressed between the sleeve 26 and the inner wall of the housing 11. The lever 85 is suitably fastened on the shaft 29 and supports the pin 33 which is pivotally mounted therein.

The cable 34 slidably moves within the conduit 35 which may be suitably anchored to conveniently located and fixed objects by clips 36. The cable 34 is fastened, at one of its ends, to the pin 33 by the screw 37, and at the other of its ends, to the movably mounted member 38 in Fig. 3. The housing 39, as disclosed in Figs. 1 and 3 is suitably and conveniently mounted on the dash panels 3, and may be provided with suitable bosses 40 and 41 in which the movably mounted member 38 may be supported. One of the ends of the conduit 35 may be secured in the boss 41 by the screw 42.

It is to be here noted that when the counterweighted portions 19 of the bell cranks 18 are moved outward from the shaft 13, by centrifugal force due to the revolving motion of the counterweighted portions 19 of the bell cranks 18 together with the sleeve 15, the arms 20 will be moved about their pivotal centers, thus forcing the sleeve 21, together with the bearing 25 and the sleeve 26, along the shaft 13. The sleeve 26 together with the spring 31 and one half of the bearing 25 will be restrained from revolving around the shaft 13 by the pins 27 engaging the slots 30 of the sleeve 26. As the sleeve 26 is slidably moved the pins 27 and levers 28 will oscillate about the center of the shaft 29, together with the lever 85, thus causing the cable 34 to slide within the conduit 35, this in turn moving the member 38 to or from the member 43.

The member 43 may be made of resilient material and is suitably fastened to the lever 44 which is pivotally mounted on the shaft 45. One end of the lever 44 is provided with a shoulder 46 which limits the deflective travel of the member 43 in one direction. However, it is to be noted that the resilient member 43 may be forced away from the shoulder 46 by the member 38. This construction eliminates any shock loads being imposed on the member 43 by the member 38 when the motor 1 is accelerated quickly in its operation with a resultant accelerated movement imparted to the counterweighted portions 19 of the bell cranks 18 and thus through the various connecting parts to the cable 34 and member 38. Also this construction insures the return of the member 43 to its normal position against the shoulder 46, said normal position always corresponding to the selected speed at which the operator desires to have the vehicle or unit travel. In Fig. 3, the member 38 is disclosed, by full lines, in a position away from the member 43, this being the normal position of the member 38 when the motor 1 is not being operated. As soon as the motor 1 is started the operation of the counterweighted portions 19 of the pivotally mounted bell cranks 18 will cause, through the various intermediate members heretofore described, the member 38 to move to a position in contact with the member 43, as shown by dotted lines at 47. The contact end of the member 38 may be rounded to insure contact with the member 43 at various adjusted positions of the lever 44. One end of the lever 44 is provided with a forked end comprising the members 48 which may be fastened to the lever 44 by the members 49 or made integral with the lever 44.

It is to be noted that the members 48 are pivotally mounted on shaft 45 which in turn is supported in the bushings 50, the bushings 50 being suitably supported in the bosses 51 of the housing 39. The bushings 50 may be constructed of suitable insulating material for electrically insulating the shaft 45 from its supporting members. The shaft 45 may be provided with the shoulder 52 which will restrain the shaft 45 from endwise movement.

Between the members 48, the member 53 is pivotally mounted by means of the extensions 54 which have their bearings in the members 48. The member 53 is constructed to receive and engage the threaded end 86 of the adjusting rod 55. The adjusting rod 55 is extended through and supported in a suitable member (not shown) attached to the instrument panel 9, the above mentioned supporting member being enclosed by the dial member 56, which is shown more clearly in Fig. 5, together with the adjusting button 57. The adjusting button 57 is suitably connected with the adjusting rod 55 and is provided with a pointer 58 for readily selecting the desired speed at which the operator desires to travel, the rates of speed being indicated by the numerals on the dial member 56.

On the toe board 7 is suitably mounted the bracket 59 which is provided with the boss 60 in which is slidably mounted the foot accelerator shaft 61 which is suitably connected to the throttle control mechanism in the fuel intake passage of the motor 1. The accelerator shaft 61 is provided with the pedal pad 62 and a suitably anchored spring (not shown) which is connected with and always tends to return the accelerator shaft 61 and its pedal pad 62 to the position, as shown in Fig. 3, which corresponds to the idling or practically closed throttle operation of the motor 1. On the bracket 59 is mounted an electrical coil 64 having the contact portion 65. Also the bell crank member 66 is pivotally mounted on the shaft 67 which is suitably supported in the bracket 59. The bell crank member 66 is provided with a contact portion 68 which is adapted to contact with the contact portion 65 of the electrical coil 64. Also the bell crank member 66 is provided with an arm 69 which is adapted to contact with the shaft 61 when the contact portion 68 is operated to a contactual position against the contact portion 65 of the electrical coil 64. The boss 60 of the bracket 59 is suitably cut away to permit the arm 69 to engage the shaft 61. Also the arm 69 may be suitably serrated or roughened to provide the necessary frictional contact with the shaft 61 to further permit the bell crank member 66, when electrically actuated to restrain the shaft 61 from movement except when displaced by exceptional pedal pressures.

The electrical coil 64 is suitably mounted on the bracket 59 so as to receive electrical current, as hereinafter disclosed, from the battery 70, which may be suitably mounted and supported from the frame 5.

The terminal 72 and the electrical wire 71, protected by the armor 73 which is shown broken away for a portion of its length, electrically connect the coil 64 and bracket 59 with the battery 70. The battery 70 may be suitably grounded, as indicated at 74, to the frame 5 or other suitable parts of the mechanism by the electrical wire 75. The bracket 59 is also electrically connected to the shaft 45 by the armored electrical cable or wire 76 together with the terminals 77 and 78, the terminal 78 being clamped against a shoulder on the shaft 45 by the nut 79. With the dial member 56 set, as shown in Fig. 5, at the numeral 20 and the motor 1 started in operation it is possible for the operator or driver to operate the accelerator shaft 61 in the usual way by depressing the pad 62 by foot pressure, thus permitting travel of the automotive vehicle or travelling unit with speeds up to 20 miles per hour. As soon as the motor 1 is started in operation, the counterweighted portions 19 of the bell cranks 18 will also begin to revolve about the shaft 13 and the counterweighted portions 19 will be moved outwardly by centrifugal force until the arms 20 of the bell crank 18 will force, by means of the sleeves 21 and 26 together with the pins 27, levers 28, shaft 29, lever 85 and cable 34, the member 38 to move toward the member 43 until the member 38 contacts with the member 43 as indicated at 47, in Fig. 3. As soon as the member 38 contacts with the member 43, the electrical circuit is closed and completed from the battery 70 through the ground wire 75, through the ground 74 of the mechanism parts including the frame 5, the dash panel 3, and the housing 39, through the member 38, the member 43, the lever 44, the members 48, the shaft 45 the terminal 78, electrical cable 76, terminal 77, the bracket 59, to the winding of the electrical coil 64 which immediately magnetizes the contact portion 65 of the electrical coil 64 and causes the contact portion 68 of the bell crank member 66 to be drawn into contact with the contact portion 65 of the electrical coil 64. This pivotal movement of the bell crank member 66 on the shaft 67 will cause the arm 69 of the bell crank member 66 to contact with and restrain the downward movement of the accelerator shaft 61. The contact of the arm 69 and the shaft 61 will provide a sufficient stop or reaction to the pressure of driver's foot on the pad 62 to permit the driver to operate the vehicle up to a 20 mile an hour speed with assurance that he will not unconsciously exceed the maximum speed of 20 miles which is the popular legal speed of many municipal corporations. It is to be noted that the electrical circuit from the electrical coil 64 is suitably completed through the terminal 72 and the wire 71 to the battery 70.

If the driver desires to pass another vehicle travelling at 20 miles an hour or more, or for any other emergency reason, he may exert a greater foot pressure on the pad 62 and so operate the vehicle without any change or adjustment of the dial member 56. When the emergency has passed or as soon as desired, the driver can decrease the foot pressure on the pad 62 to normal operating pressures and immediately know that the speed of the vehicle is again automatically restrained from any speed exceeding 20 miles until, by a direct and conscious effort, he again desires to increase the travelling speed of the vehicle.

Whenever the vehicle passes out of a zone of travel, in which a definite rate of speed is legally maintained, to a zone of travel where the legal rate of speed is greater or where, perhaps, no speed limit is legally maintained, the driver may revolve the dial member 56 by the button 57 to any desired speed or to a position beyond the ability of the vehicle, at which point no control restraint will be imposed by the control mechanism.

It is to be noted that whenever the speed of the vehicle or unit falls below the selected speed as indicated on the dial member 56, the decreased speed of operation of the motor will allow the counterweighted portions 19 of the bell cranks 18 to again move toward the shaft 13 which, in turn will allow the spring 31 to force the sleeves 26 and 21 towards the arms 20, this causing the levers 28, shaft 29, lever 85, and cable 34 to move the member 38 away from the member 43, as disclosed by the full lines of 38, thus breaking the contact between the members 38 and 43 and opening the electrical circuit as above described. This opening of the electrical circuit will immediately cause the bell crank member 66 to move its contact portion 68 away from the contact portion 65 of the electrical coil 64, this in turn moving the arm 69 away from contact with the shaft 61, thus removing the restraint on the shaft 61 and allowing the driver to operate the shaft 61 in the usual way until he unconsciously again attains the selected speed indicated on the dial member 56, when the arms 69 will again automatically contact with and bind or restrain the shaft 61 so the driver cannot unconsciously exceed the selected speed as indicated on the dial member 56.

It is to be noted that the bell crank member 66 can be proportioned to provide the proper leverages for imposing any desired restraint on the shaft 61.

My invention will render it impossible for any driver to unconsciously exceed the legal limits of the various speed zones through which he may be driving a vehicle and at the same time it will not compel him to operate his vehicle at a disadvantageous rate of speed as would be the case if the motor was governed by a mechanism not having manually operated adjusting means located within easy reach of driver in his operating position.

It is also to be noted that whereas I have described my invention as being applied to an automotive vehicle, I do not wish to limit my invention to such units, as it may be successfully applied to any moving unit impelled by similar means.

I claim:

1. In a speed control mechanism, the combination of a movable member operated by revolving means, a pivotally mounted member adapted to contact with said movable member to establish an electrical connection therethrough, adjustable means for changing the position of said pivotally mounted member relative to said movable member operated by revolving means, a movable pedal member, and means for restraining the movement of said pedal member, said last mentioned means being electrically controlled, in its operation, by the relative positions of said movable member operated by revolving means and said pivotally mounted member.

2. In a unit adapted for travel, the combination of an engine, a movably mounted member operated by said engine in accordance with the speed of said engine, means for accelerating the speed of said engine, means for imposing resistance to the operation of said first mentioned means, electrical means for operating said last mentioned means, means for opening and closing the electrical circuit of said electrical means, said last mentioned means being actuated by said movably mounted member, and adjustable means for timing said last mentioned means in relation to the speed of the unit adapted for travel.

3. In a speed control mechanism for a travelling unit comprising an engine, the combination of means for accelerating the speed of travel of said unit, frictional means for restraining the movement of said first mentioned means, and means for adjustably selecting the speed of the traveling unit at which said frictional means for accelerating will be restrained in its operation, said last mentioned means being automatically locked in its selected position.

4. In a speed control mechanism, the combination of speed accelerating means, means for engaging said speed accelerating means, said last mentioned means thereby partially restraining the operation of said first mentioned means, and means for automatically operating said last mentioned means.

5. In a speed control mechanism, the combination of speed accelerating means, means for partially restraining the operation of said first mentioned means, and means for adjustably selecting a rate of speed at which said second mentioned means will partially restrain the operation of said first mentioned means.

6. In a speed control mechanism for a travelling unit comprising an engine, the combination of a pedal accelerator, a member for supporting said pedal accelerator, an oscillating member suitably mounted on said first mentioned member, said oscillating member being adapted to engage said pedal accelerator and impede the operation of, and means for operating said oscillating member.

7. In a speed control mechanism for a travelling unit, the combination of speed accelerating means and electrically operated means for partially restraining said speed accelerating means at a selected rate of travelling speed.

8. In a speed control mechanism for a vehicle comprising an engine, the combination of a slidably mounted contact member actuated by the operation of the engine, a contact member movably mounted adjacent said slidably mounted contact member, said last mentioned contact member being supported independently of said slidably mounted contact member, manual means for moving said last mentioned contact member relative to said slidably mounted contact member, and electrical means controlled by the movements of said slidably mounted and said last mentioned contact members, said electrical means being suitably connected to said contact members to permit an electrical current to flow through said contact members to energize said electrical means.

9. In a speed control mechanism, the combination of a revolvable member for selecting the maximum rate of controlled speed, said revolvable member comprising a handle portion together with indicating means for selecting the rate of controlled speed.

10. In a speed control mechanism for a travelling unit comprising an engine, the combination of means for accelerating the speed of the engine, pivotally mounted means for selecting a rate of speed at which it is desired that said unit shall normally travel, said pivotally mounted means being manually operated, and means for impeding the operation of said first mentioned means, the operation of said last mentioned means being responsive to the operation of said manually operated means.

11. In a speed control mechanism for a travelling unit, the combination of speed accelerating means, means for automatically engaging and impeding the operation of said speed accelerating means at a selected rate of travelling speed, and means for adjustably varying the selected rate of travelling speed through steps of variable length.

12. In a speed control mechanism for a travelling unit, the combination of speed accelerating means, means for impeding the operation of said speed accelerating means at a selected maximum rate of speed of the travelling unit, said last mentioned means permitting further accelerating operation of said first mentioned means while being impeded in its operation by said last mentioned means, means for operating said second mentioned means, and means for selecting various maximum rates of speed of the travelling unit at which said second mentioned means will impede said speed accelerating means.

13. In a speed control mechanism for an engine, the combination of electrically operated means together with an electrical circuit therefor for moving a member into engagement with speed accelerating means, movably mounted contact members for closing the electrical circuit to energize said electrical means at a predetermined rate of engine speed, movably mounted engine speed accelerator means, and a member moved into engagement with said speed accelerator means by the closing of said electrical circuit to interrupt the movement of said speed accelerator means at the predetermined rate of engine speed.

14. In an adjustable speed control mechanism; the combination of centrifugally operated means for operating a movably mounted member, a pivotally mounted member adapted to contact with said movably mounted member, means for adjustably moving said pivotally mounted member to or from said movably mounted member, speed accelerating means, and means for opposing the operation of said speed accelerating means, the operation of said last mentioned means being initiated by the contacting of said movably mounted member and said pivotally mounted member.

15. In a vehicle comprising a prime mover, the combination of speed indicating means for adjustably selecting the maximum rate of speed at which the vehicle will be normally driven by the prime mover, said speed indicating means being remotely located from the prime mover, and means for accelerating the speed of the prime mover to cause the vehicle to be driven at speeds higher than the rate of speed indicated by said speed indicating means, said last mentioned means being adapted to accelerate the speed of the prime mover to drive the vehicle at rates of speed above the rate of speed at which said speed indicating means is adjusted to without further adjustment of said speed indicating means.

16. In a vehicle comprising an engine, the combination of means movably operated by the engine to a predetermined position corresponding to a certain speed of the engine, said means being adapted to contact with a movably mounted member, a movably mounted member suitably located and adapted for contact with said means, adjustably mounted means for manually moving said movably mounted member to and from said means, and means for manually accelerating the speed of the engine, said last mentioned means being automatically impeded by the operation of said movably mounted member.

17. In a speed control mechanism for an engine, the combination of speed accelerating means, means for engaging said speed accelerating means to restrain its operation, electrical means for operating said means for restraining the operation of the speed acceleration means, a pair of movably contact members adapted to permit a flow of electrical energy therethrough to energize said electrical means, means for automatically moving one of said contact members, said means being operatively actuated by the engine, and means for adjustably moving one of said contact members to or from the other of said contact members to select the speed at which said speed accelerating means will be restrained in its operation by said second mentioned means.

18. In a speed control mechanism for a travelling unit comprising an engine, the combination of accelerator means for accelerating the speed of the engine, electrically operated means for selecting the maximum rate of speed to which the engine may be normally accelerated to propel the unit, said electrically operated means comprising an electrically operated member for engaging said accelerator means, and means for manually adjusting the operative position of said electrically operated means to select different maximum rates of speed to which the engine may be normally accelerated to propel the unit.

19. In a speed control mechanism for a vehicle comprising an engine together with a dash member, the combination of a pair of members suitably supported by the dash member of the vehicle and operatively movable to and from one another, the position of said pair of members relative to one another determining the maximum rate of speed at which the engine will normally propel the vehicle, and means for accelerating the speed of the engine to propel the vehicle at the maximum rate determined by the position of said pair of members relative to one another, said last mentioned means being operatively responsive to the operation of said pair of members.

JOHN W. TATTER.